Dec. 20, 1932.  R. V. SAVAGE  1,891,783
MICROMETER
Filed March 17, 1930
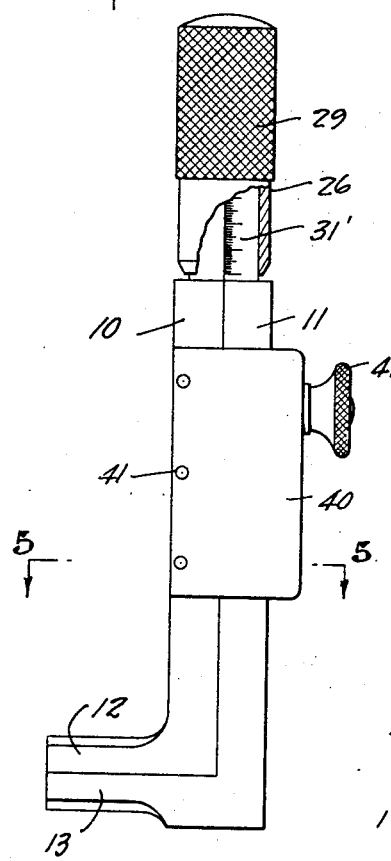
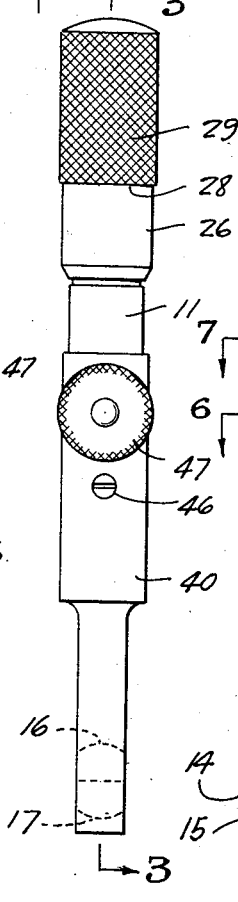
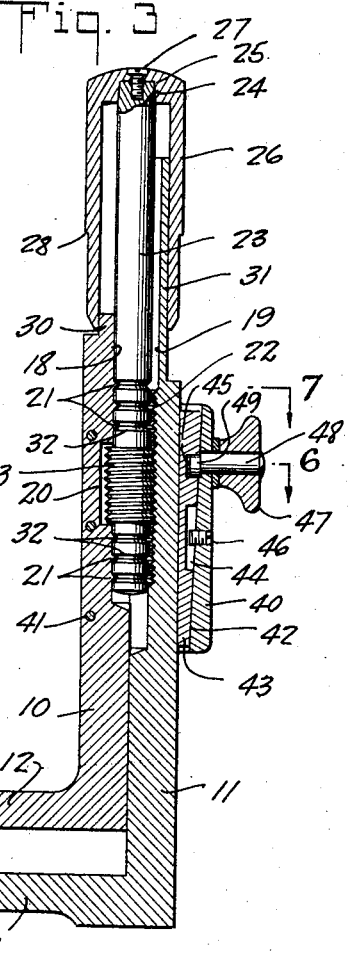
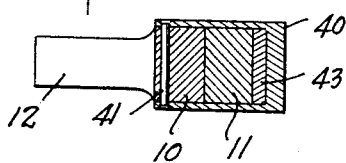
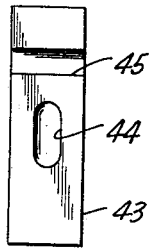
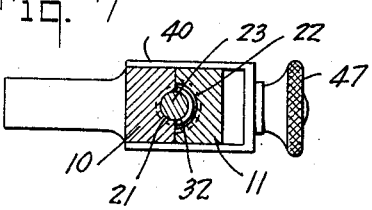
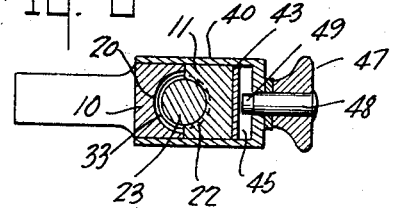
INVENTOR.
Ralph V. Savage
BY B. J. Craig,
ATTORNEY.

Patented Dec. 20, 1932

1,891,783

UNITED STATES PATENT OFFICE

RALPH V. SAVAGE, OF LOS ANGELES, CALIFORNIA

MICROMETER

Application filed March 17, 1930. Serial No. 436,397.

This invention relates to micrometers.

The general object of my invention is to provide a micrometer which is highly accurate and which maintains its accuracy regardless of wear.

This invention relates to new and useful improvements in micrometers designed especially in measuring the inner and outer diameters of tubes or solid members, and consists of a simple and efficient device of this character having various details of construction, combination and arrangement of parts which will be hereinafter fully described, shown in the accompanying drawing and then specifically defined in the appended claims.

Other objects of my invention will be apparent from the following description taken in connection with the accompanying drawing wherein:

Fig. 1 is a side elevation of my improved micrometer, a portion being broken away to illustrate the scale formed upon the same.

Fig. 2 is a rear view of the micrometer.

Fig. 3 is a central longitudinal sectional view on line 3—3 of Fig. 2.

Fig. 4 is a detail front view of a wedge shaped member.

Fig. 5 is a sectional view on line 5—5 of Fig. 1.

Fig. 6 is a sectional view on line 6—6 of Fig. 3, and

Fig. 7 is a sectional view on line 7—7 of Fig. 3.

Referring to the drawing by reference characters I have indicated my invention as embodied in a body comprising two members 10 and 11 each consisting of a shank handle portion and a jaw portion. These jaws are flat on opposed faces 14 and 15 and are rounded on their outer faces 16 and 17. The jaws are adapted to be inserted within an aperture to measure the size thereof, or to be placed against opposite points to measure the distance therebetween.

The members 10 and 11 are provided with semi-cylindrical recesses 18 and 19 in their outer ends. The recess 18 includes a portion 20 intermediate the length thereof which is of greater depth. The recess 18 is provided with ribs or lugs 21 which are spaced longitudinally along the member 10. The member 11 is provided with threads 22 as shown.

A rod 23 is fitted at its outer tapered end 24 in an aperture 25 in a cap 26 and is secured thereto as by a screw 27. The cap may have its outer surface stepped as at 28 and may be milled to afford a good grip as at 29.

This cap 26 has a bearing on a shoulder portion 30 on the member 10 and also has a bearing on a convex semi-cylindrical, extension 31 of the member 11. This extension has a scale 31' thereon which is read with the lower edge of the cap 26 as an indicator. The rod 23 has annular grooves 32 therein which fit the lugs or ribs 21 so that when the cap 26 is turned the rod will be held against linear movement relative to the member 10. The rod is spaced from the threads 22 and the rod includes an enlarged threaded portion 33 which fits the enlarged recess 20 and also engages the threads 22.

The construction is such that when the cap 26 is rotated the member 11 is moved longitudinally with respect to the member 10 so that the jaws 12 and 13 may be moved to adjusted position.

In order to hold the members 10 and 11 assembled I provide a U shaped shell 40 which may be held in place by rivets or other suitable fastening means 41 engaging the member 10 and allowing the member 11 to move through the shell.

The inner face 42 of the shell 40 is inclined and against this inclined face I arrange a wedge shaped plate 43 which also engages the contiguous surface of the member 11. The plate 43 is provided for the purpose of taking up any wear intermediate the threads 33 and the threads 22 formed in the bottom of the recess in the member 1. The wedge-shaped plate is provided with an elongated groove 44 and a transverse recess 45. The recess 44 is adapted to receive an adjusting screw 46 fitted in a threaded aperture in the shell 40 and when the screw is turned it serves to hold the wedge-shaped member in adjusted position. A knob 47 is fixed to a stem 48 having at its inner end a cam 49 engaging the transverse recess 45, the cam member being adapted as the knob is turned to give a slight longitudinal adjustment to the wedge-shaped member, after which the adjustment is held by the screw 46.

In operation, when a workman desires to measure the inner diameter of the tubular member, the two ends 12 and 13 are inserted within the member and the ends separated by turning the cap 29 to thus cause the ends 12 and 13 to separate until they contact with the wall of the tube being measured. The thickness of the two ends is a known constant for each instrument, which is added to the scale reading when measuring the inside of the tubular article. This known constant may be marked on the micrometer in a desired location. To measure the outer diameter of a tube or solid member, the inner face of the angled ends 12 and 13 are placed on the outside of the tube or other member at opposite points and the cap 29 turned in the opposite direction, until the inner face of the parts 12 and 13 come in contact with the member being measured.

What I claim is:

1. A micrometer comprising a body including two relatively movable members having opposed faces, each member having a jaw thereon, means for adjustably connecting said members to each other, each member having a recess in the opposed face thereof, one of said recesses having spaced lugs and the other having threads therein, and a rod having threads engaging the first named threads and having peripheral recesses engaging said lugs.

2. A micrometer including a body comprising two relatively movable members each having a jaw and a shank portion, means to move one of said members relatively to the other member, a fastening means to hold said two members assembled, and a wedge cooperating with said fastening means to maintain correct operation.

3. A micrometer comprising a body including two members, each member having a jaw thereon, said members having adjacent faces with a recess in each face, one of said recesses having spaced lugs and the other recess having threads therein, a rod swiveled to one of said members, said rod having threads engaging said first named threads and having peripheral recesses engaging said lugs, and means to hold said members in assembled relation.

4. A micrometer for measuring inner and outer diameters of tubes, etc., which comprises two relatively movable members each having a shank portion, said shank portions together forming a split cylindrical portion adjacent one end thereof, each member being provided with a jaw portion at an angle to the shank portion, a rod having swiveled connection with one of said members and threaded engagement with the other member and adapted to give the latter a movement in the direction of its length as the rod is turned, a cap surrounding the split cylindrical portion and rotatable therearound, said rod being secured to said cap.

5. A micrometer for measuring inner and outer diameters of tubes, etc., comprises two relatively movable members, said members having adjacent faces and each having a shank portion a part of which is semi-cylindrical, each member being provided with an end at an angle to its shank portion, a rod having swiveled connection with one of said members and a threaded connection with the other member and adapted to give the latter a movement in the direction of its length as the rod is turned, a cap adapted to turn about the semi-cylindrical part of said members and to which the rod is fastened, and means for taking up wear between the threaded portions of the rod and the movable member.

6. A micrometer including a body comprises two relatively movable members each having a jaw and a shank portion, said shank portions having opposed faces, a rod having swiveled connection with one of said members, said rod having threads thereon, the other member having threads cooperating with said rod threads whereby said member will move in the direction of its length when the rod is turned, a cap adapted to turn about the ends of the shank portions of said members, said rod being fastened to said cap, a shell fastened to one of said members and embracing the other member, a wedge interposed between the shell and the said other member, means on the shell for moving the wedge in the direction of its length, and a screw for holding the wedge in an adjusted position.

7. A micrometer for measuring inner and outer diameters comprising two relatively movable members having adjacent shank portions, a rod having rotatable non-sliding engagement with one of said members, coacting threaded portions on said rod and the other member and adapted to give said other member a movement in the direction of its length as the rod is turned, a cap to which the rod is fastened, a shell fastened to one of said members and embracing the other member, a wedge interposed between the shell and the movable member and having a transverse recess in its outer face, a knob having a stem swiveled in said shell and provided with a cam and designed to engage the walls of the recess to cause the wedge to move in the direction of its length as the stem is rotated, and means for holding the wedge in an adjusted position.

8. A micrometer comprising two L-shaped members having adjacent faces and each recessed upon its adjacent face, ribs in the bottom of the recess in one member, a rod with circumferential grooves engaged by said ribs, a cap on said rod and positioned on the end portions of the two members, the recess in the other member having threads therein, said rod having a cylindrical portion circumferentially threaded and engaging the threads in the threaded recess, the outer circumference of said other member having a graduated scale thereon, and means for taking up wear between the threaded portions of the rod and said other member.

9. A micrometer for measuring inner and outer diameters of tubes, etc., comprises two relatively movable members having adjacent faces and each having a shank portion, a part of each of said shank portions being semi-cylindrical, each member being provided with an end at an angle to the shank portion, a rod having swiveled connection with one of said members and threaded connection with the other member and adapted to give the latter a movement in the direction of its length as the rod is turned, a cap adapted to turn about the semi-cylindrical portions of said members and to which the rod is fastened, a shell fastened to said first mentioned member and embracing the other member, a recessed wedge interposed between the shell and said second named member and having a transverse recess in its outer face, a knob having a stem swiveled to said shell, a cam on said stem, said cam being designed to engage the walls of the recess in said wedge to cause the latter to move in the direction of its length as the stem is rotated, and means for holding the wedge in an adjusted position.

10. A micrometer for measuring inner and outer diameters of tubes, etc., comprises two relatively movable members having adjacent faces and each having a shank portion a part of which is semi-cylindrical, the members each being provided with an end at an angle to its shank portion, a rod having swiveled connection with one of said members and a threaded connection with the other member and adapted to give the latter a movement in the direction of its length as the rod is turned, a cap adapted to turn about the semi-cylindrical parts of said members and to which the rod is fastened, a shell fastened to said first named member and embracing the other member, a wedge interposed between the shell and said second named member, means upon the shell for moving the wedge in the direction of its length, and a screw for holding said wedge in adjusted position.

11. A micrometer for measuring inner and outer diameters of tubes, etc. comprising two relatively movable members having adjacent faces, each having a shank portion a part of which is semi-cylindrical, each member being provided with an end at an angle to its shank portion, ribs on one of said members, a cylindrical rod with circumferential grooves engaging said ribs, a cap fitted to the end of the rod and having a bearing about the semi-cylindrical parts of said members, threads in the other of said members, said rod having circumferential threads engaging the threads of said other member, the semi-cylindrical part of said other member having a graduated scale thereon, and cooperating with the cap, and means for taking up wear between the threaded portions of the rod and said member.

12. A micrometer for measuring inner and outer diameters of tubes, etc. comprising two relatively movable members having adjacent faces and each having a shank portion a part of which is semi-cylindrical, the adjacent faces of the members being flat, each member being provided with an end at an angle to its shank portion, a rod having swiveled connection with one of said members and threaded connection with the other member and adapted to give the latter a movement in the direction of its length as the rod is turned, a cap adapted to turn about the semi-cylindrical parts of said members and to which the rod is fastened, a shell fastened to said first named member and embracing the other member and provided with an aperture, a recessed wedge interposed between the shell and the second named member and having a transverse recess in its outer face, a knob with a stem swiveled in said shell and provided with a cam designed to engage the walls of the recess in said wedge to cause the latter to move in the direction of its length as the stem is rotated, a screw fitted in the aperture in the shell and adapted to engage the bottom of the recess in the face of the wedge to hold said wedge in adjusted position.

In testimony whereof, I hereunto affix my signature.

RALPH V. SAVAGE.